(12) United States Patent
Heathcott et al.

(10) Patent No.: US 12,441,278 B1
(45) Date of Patent: Oct. 14, 2025

(54) VEHICLE SUPPORT STAND DEVICE

(71) Applicants: Kevin Heathcott, Kenockee, MI (US);
Jennie Heathcott, Kenockee, MI (US)

(72) Inventors: Kevin Heathcott, Kenockee, MI (US);
Jennie Heathcott, Kenockee, MI (US)

( * ) Notice: Subject to any disclaimer, the term of this patent is extended or adjusted under 35 U.S.C. 154(b) by 0 days.

(21) Appl. No.: 18/141,980

(22) Filed: May 1, 2023

(51) Int. Cl.
B60S 9/04 (2006.01)
(52) U.S. Cl.
CPC ........................................ B60S 9/04 (2013.01)
(58) Field of Classification Search
CPC .......................................................... B60S 9/04
USPC ................................ 248/352, 676; 254/133 R
See application file for complete search history.

(56) References Cited

U.S. PATENT DOCUMENTS

| | | | |
|---|---|---|---|
| 2,493,295 A | 1/1950 | Kron | |
| 3,317,218 A | 5/1967 | Rivolta | |
| 3,891,177 A * | 6/1975 | Jerrel | B25H 1/0007 |
| | | | 248/676 |
| 5,375,410 A | 12/1994 | Briesch et al. | |
| 5,619,800 A * | 4/1997 | Unruh | G01B 5/255 |
| | | | 33/203.18 |
| 6,764,083 B2 * | 7/2004 | Bernard | B09B 3/30 |
| | | | 280/30 |
| 8,141,837 B2 * | 3/2012 | Charters | B60S 11/00 |
| | | | 254/133 R |
| 10,661,600 B2 * | 5/2020 | Franklin | B60B 3/02 |
| 11,448,361 B1 | 9/2022 | Dorame, Jr. et al. | |
| 2009/0242720 A1 | 10/2009 | Charters | |
| 2010/0314510 A1 | 12/2010 | Munn et al. | |
| 2021/0284105 A1 | 9/2021 | Kochie et al. | |

* cited by examiner

Primary Examiner — Todd M Epps
(74) Attorney, Agent, or Firm — Cramer Patent & Design, PLLC.; Aaron R. Cramer

(57) ABSTRACT

A vehicle support stand device is a device to support a motor vehicle, trailer, or similar device in lieu of a wheel. The device provides for an "L" shaped support bracket that bolts on to the vehicle or trailer in place of the wheel (tire/rim combination). The base of the bracket is approximately four- and one-half inches (4½") deep and eleven and seven-eighths of an inch (11⅞") long. The upper portion of the bracket is fifteen and a half inches (15½") tall, and eight inches (8") wide. A series of holes, corresponding to the tire bolt pattern, is provided at the upper side of this component. Finally, a gusset plate, with the approximate dimensions of seven inches (7") tall and three and a half inches (3½") deep is welded in a perpendicular manner along the joint between the "L"-shaped base and upper portion. The device is used in the same manner as a jack stand in that the vehicle or trailer is jacked up, the wheel unbolted and removed, and the vehicle support stand device bolted in place.

1 Claim, 7 Drawing Sheets

VEHICLE SUPPORT STAND DEVICE

RELATED APPLICATIONS

None.

FIELD OF THE INVENTION

The present invention relates generally to a support stand and more specifically to a vehicle support stand device.

BACKGROUND OF THE INVENTION

There are a great many situations where a motor vehicle or trailer needs to have one or more of its wheels removed. Such situations can range from repair, rebuilding, tire rotation, long term storage where one does not want the tire in contact with the ground, or even as a theft deterrent. Many people resort to the use of jack stands for this purpose.

However, such jack stands are relatively expensive, do not support the vehicle in the same method or manner as a tire, and perhaps most importantly, are prone to allowing side-to-side motion which can result in the vehicle falling from the jack stand. Accordingly, there exists a need for a means by which trailers, motor vehicles, and similar devices can be supported without wheels in place while avoiding the problems as described above. The development of the vehicle support stand device fulfills this need.

SUMMARY OF THE INVENTION

To achieve the above and other objectives, the present invention provides for a vehicle support stand device having a main vertical plate positioned on top of a horizontal baseplate in a perpendicular manner and a gusset plate positioned between the main vertical plate and the horizontal baseplate at a forty-five-degree angle. An upper part of the main vertical plate includes a four-lug pattern having a main center hub hole and four lug holes. The main center hub hole and the four lug holes are adapted to align with the holes on a standard four-lug pattern wheel rim. The standard four-lug pattern may support a vehicle. The vehicle support stand device may provide strength to the vehicle and the gusset plate which prevents deformation of the main vertical plate and the horizontal baseplate under heavy side forces.

The vehicle support stand device may protect the vehicle and/or one or more tires from theft and provides universal use on all types of vehicles with any type of lug pattern. The vehicle support stand device may provide increased accessibility in a wheel well area for easier repair and/or maintenance of the vehicle and protection of expensive aftermarket wheels rims that are removed from the vehicle due to exposure to the elements. The vehicle may be selected from the group consisting of an antique vehicle, a future vehicle, a recreational vehicle having a motorhome, a travel trailer, a fifth wheel vehicle, an agricultural trailer, a utility terrain vehicle, an agricultural vehicle, a boat trailer, a snowmobile trailer, a utility trailer, an enclosed trailer, or a jet ski trailer.

The upper part of the main vertical plate may include a five-lug pattern with a main center hub hole and five lug holes. The main center hub hole and the five lug holes may be adapted to align with the holes on a standard five-lug pattern wheel rim. The main vertical plate and the horizontal baseplate may be continuous in nature and bent into a right-angle shape. The main vertical plate may be fifteen and one-half inches tall and eight inches wide. The horizontal baseplate may be eleven and seven-eighths inches and four and one-half inches deep. The gusset plate, the horizontal baseplate, and the gusset plate may be joined together by welding.

The gusset plate, the horizontal baseplate, and the gusset plate may be joined together by bolting. The gusset plate, the horizontal baseplate, and the gusset plate may be joined together by riveting. The main vertical plate, the horizontal baseplate, and the gusset plate may be made of one-quarter inch plate steel. The gusset plate may be seven inches long on its upper free side, and three and one-half inches long on its lower free side. The vehicle support stand device may provide a stable platform that is not subject to accidental dislodgement due to bumping or jostling. The vehicle support stand device provides physical protection of a removed tire from UV exposure, a flat spot, rot, and environmental exposure.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 2:
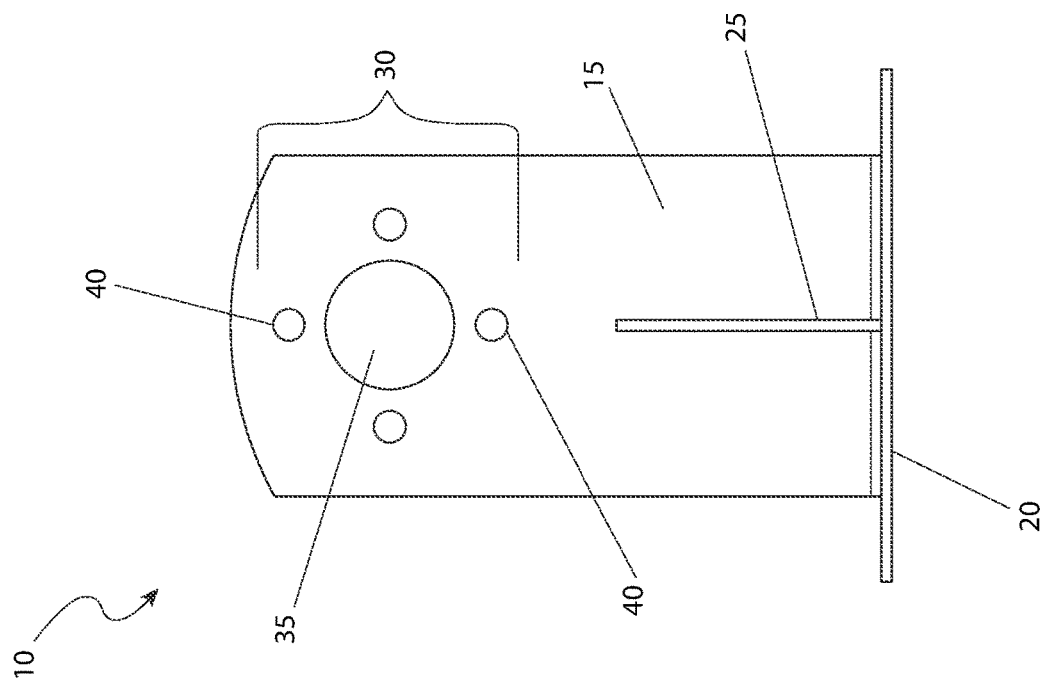
FIG. 2 is a front view of the vehicle support stand device, according to the first embodiment of the present invention.

10 vehicle support stand device
15 main vertical plate
20 horizontal baseplate
25 gusset plate
30 four-lug pattern
35 main center hub hole
40 lug hole
45 vehicle
50 lug nut 55 tire
60 wheel well
65 five-lug pattern
70 uni-lug pattern

DESCRIPTION OF THE PREFERRED EMBODIMENTS

The best mode for carrying out the invention is presented in terms of its preferred embodiment, herein depicted within FIGS. 1 through 10. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
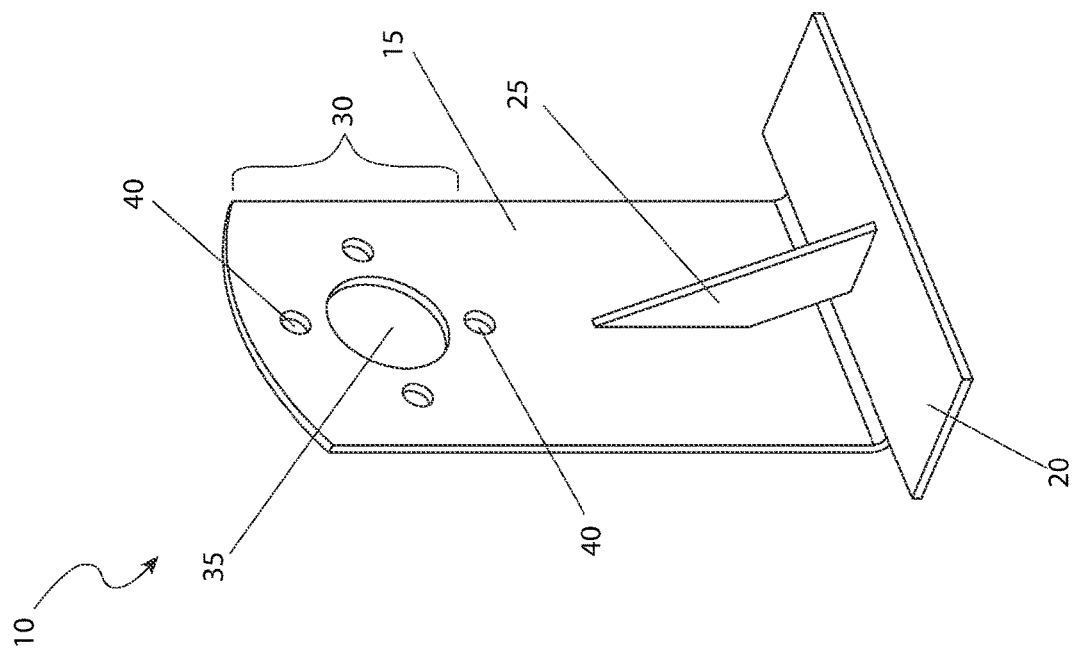
FIG. 1 is a perspective view of the vehicle support stand device, according to the first embodiment of the present invention.

Referring now to FIG. 1, a perspective view of the vehicle support stand device 10, according to the first embodiment of the present invention is disclosed. The vehicle support stand device (herein also described as the "device") 10, supports a motor vehicle 45, trailer, or similar device in lieu of a wheel. The device 10 provides for a main vertical plate 15 positioned on top of a horizontal baseplate 20 in a perpendicular manner. A gusset plate 25 is positioned between the main vertical plate 15 and the horizontal baseplate 20 at approximately a forty-five-degree (45°) angle. The main vertical plate 15, the horizontal baseplate 20, and the gusset plate 25 would be made of one-quarter inch (¼ in.) plate steel. The main vertical plate 15 is approximately fifteen and one-half inches (15½ in.) tall and eight inches (8 in.) wide. The horizontal baseplate 20 is approximately eleven and seven-eighths inches (11⅞ in.) and four and one-half inches (4½ in.) deep. The gusset plate 25, the horizontal baseplate 20, and the gusset plate 25 would be joined together by welding. Other methods of attachment such as bolting, riveting, and the like may also be used. As such, the exact method of attachment may not be considered as a limiting factor of the present invention. Other methods of construction in which the main vertical plate 15 and the horizontal baseplate 20 are continuous in nature and bent into a right-angle shape may also be considered. After manufacture, a suitable protective finish such as paint or plating would be applied to prevent corrosion.

The upper part of the main vertical plate 15 would be provided with a four-lug pattern 30 comprising a main center hub hole 35 and four (4) lug holes 40. The main center hub hole 35 and the lug holes 40 would be configured, in this first embodiment of the same proper size and orientation to align with the holes on a standard four-lug pattern wheel rim. The use of the device 10 with the four-lug pattern 30 allows for the support of a vehicle 45 in the same manner as a tire 55. Further detail on the use of the device 10 will be provided herein below.

Referring next to FIG. 2, a front view of the device 10, according to the first embodiment of the present invention is depicted. This depiction provides further clarification on the main vertical plate 15, the horizontal baseplate 20, the gusset plate 25, the four-lug pattern 30, the main center hub hole 35, and the lug holes 40.

Figure 3:
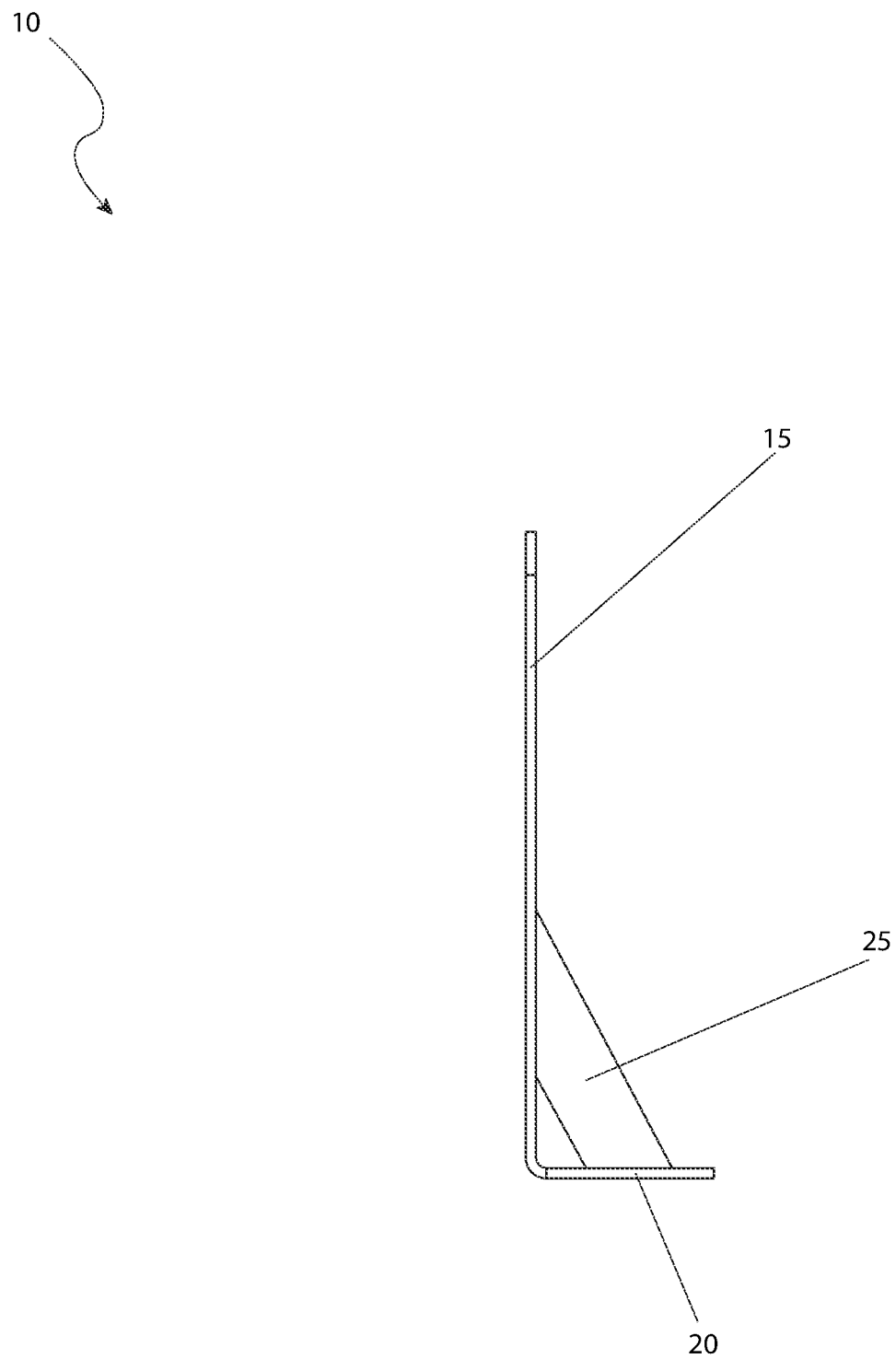
FIG. 3 is a side view of the vehicle support stand device, according to the preferred embodiment of the present invention.

Referring now to FIG. 3, a side view of the device 10, according to the preferred embodiment of the present invention is shown. This depiction again provides further clarification on the main vertical plate 15, the horizontal baseplate 20, and the gusset plate 25. The gusset plate 25 is envisioned to have approximate dimensions of seven inches (7 in.) on its upper free side, and three and one-half inches (3½ in.) on its lower free side.

Figure 4:
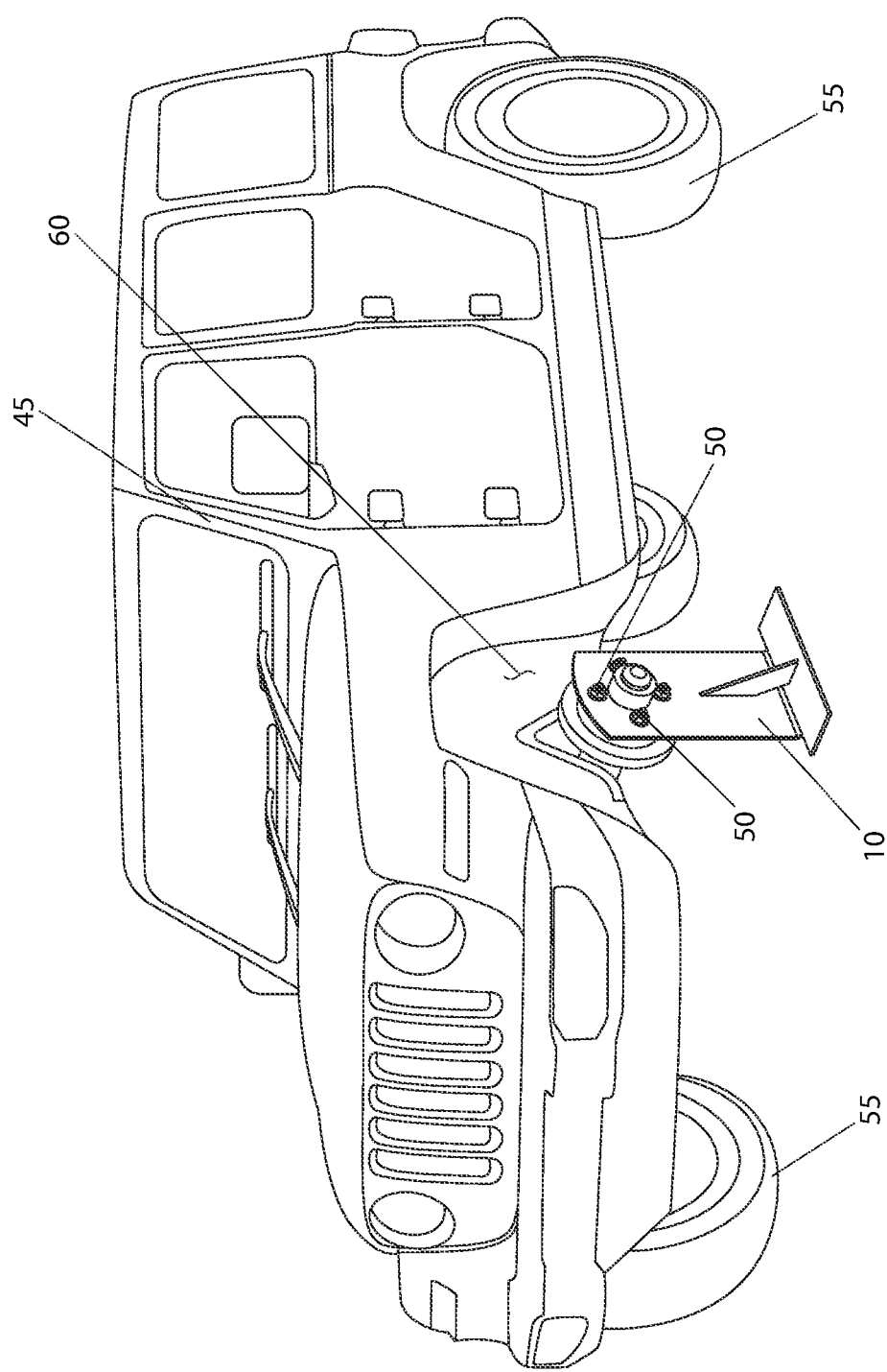
FIG. 4 is a perspective view of the vehicle support stand device, shown in a utilized state, according to the preferred embodiment of the present invention.

Referring next to FIG. 4, a perspective view of the device 10, shown in a utilized state, according to the preferred embodiment of the present invention is disclosed. The device 10 is shown in an installed state on a vehicle 45. The vehicle 45 is depicted as a modern motor vehicle for purposes of illustration. However, other types of vehicles 45 including but not limited to antique vehicles, future vehicles, recreational vehicles including motorhomes, travel trailers, and fifth wheels, agricultural trailers, utility terrain vehicles (UTV's), agricultural vehicles, boat trailers, snowmobile trailers, utility trailers, enclosed trailers, jet ski trailers, and the like. As such, the use of any specific type of vehicle 45 is not intended to be a limiting factor of the present invention.

The device 10 is attached to the vehicle 45 via use of lug nuts 50 in the same manner as a conventional tire 55. The removal of the tire 55 and subsequent replacement with the device 10 allow for greater access around the wheel well 60 for purposes of maintenance or repair. Additionally, as the tire 55 is removed, it may be stored in an indoor location in an unloaded state. As such, the removed tire 55 is protected from UV radiation, rot, flat spots, and the like. Finally, with one (1) or more tires 55 removed, the vehicle 45 is protected against theft. While FIG. 4 is shown with the first embodiment of the device 10, the second and third embodiments to be described herein below, may also be utilized in a similar manner.

Figure 5:
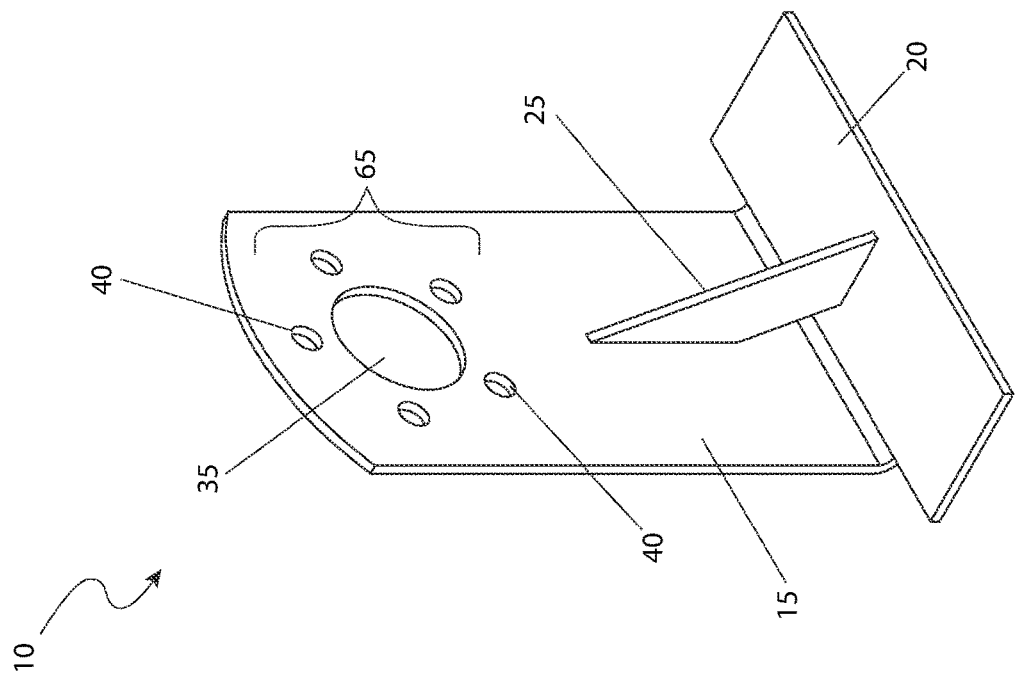
FIG. 5 is a perspective view of the vehicle support stand device, according to the second embodiment of the present invention.

Referring now to FIG. 5, a perspective view of the device 10, according to the second embodiment of the present invention is depicted. The previous teachings of the first embodiment including the main vertical plate 15, the horizontal baseplate 20, and the gusset plate 25 are again provided in the same size and configuration and would be made of one-quarter inch (¼ in.) plate steel. The upper part of the main vertical plate 15 would be provided with a five-lug pattern 65 consisting of a main center hub hole 35 and five (5) lug holes 40. The main center hub hole 35 and the lug holes 40 would be configured, in this second embodiment, with the same proper size and orientation to align with the holes on a standard five-lug pattern wheel rim. As before, the use of the device 10 with the four-lug pattern 30 allows for the support of a vehicle 45 in the same manner as a tire 55, as seen in FIG. 4.

Figure 6:
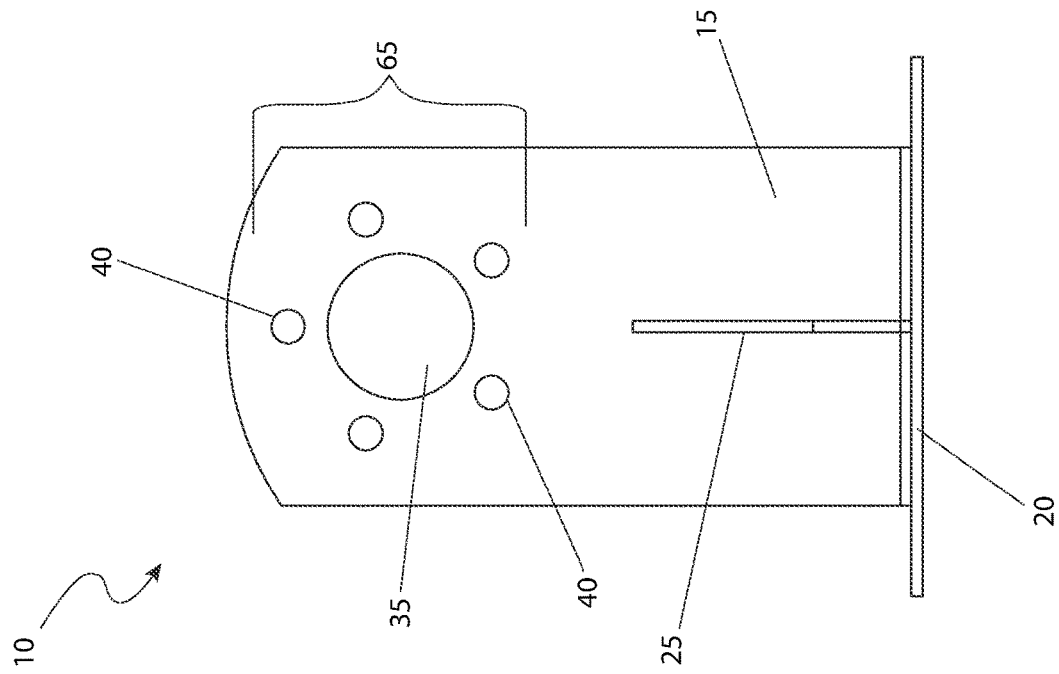
FIG. 6 is a front view of the vehicle support stand device, according to the second embodiment of the present invention.

Referring next to FIG. 6, a front view of the device 10, according to the second embodiment of the present invention is shown. This depiction provides further clarification on the main vertical plate 15, the horizontal baseplate 20, the gusset plate 25, the five-lug pattern 65, the main center hub hole 35, and the lug holes 40 of the second embodiment.

Figure 7:
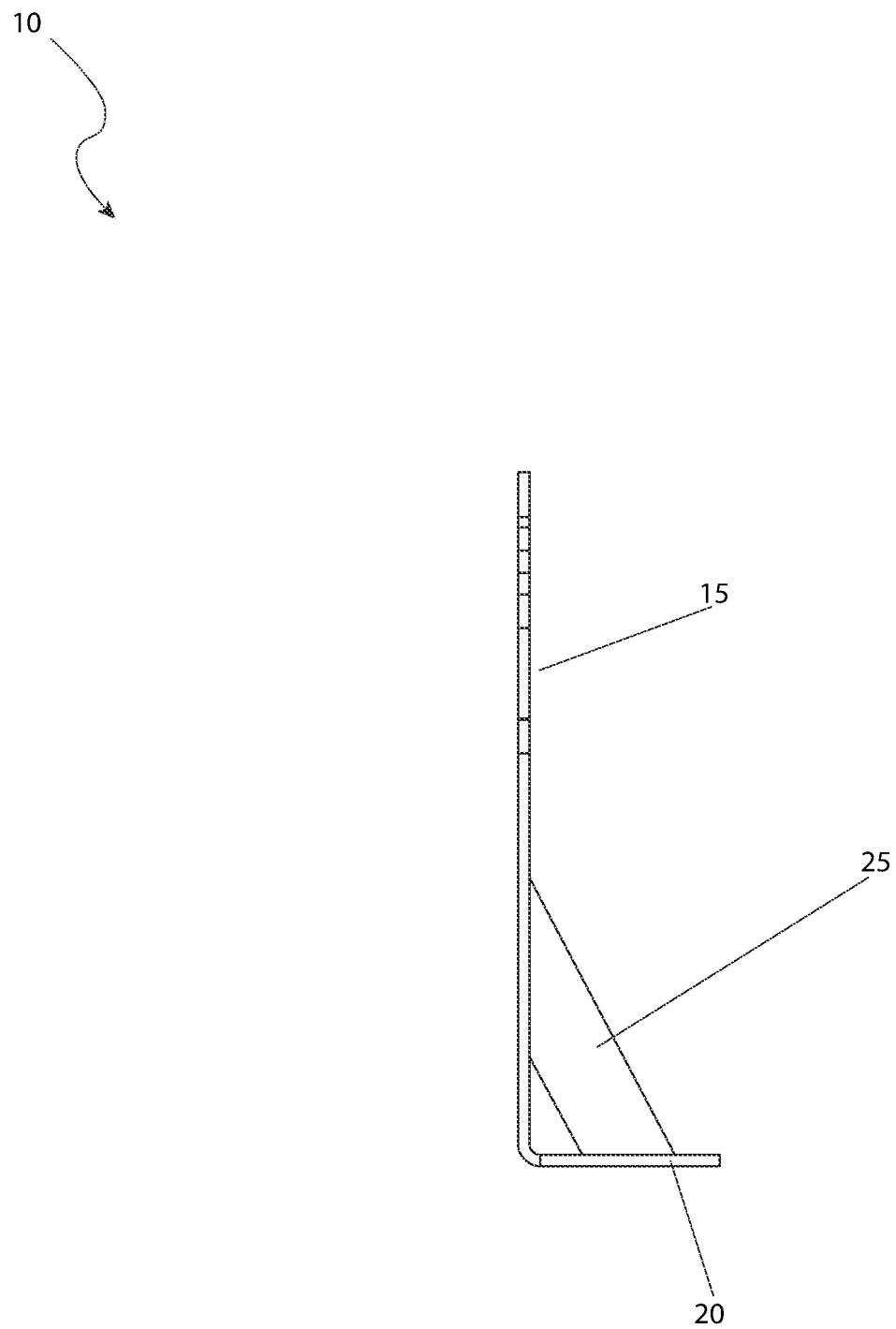
FIG. 7 is a side view of the vehicle support stand device, according to the second embodiment of the present invention.

Referring now to FIG. 7, a side view of the device 10, according to the second embodiment of the present invention is disclosed. This depiction again provides further clarification on the main vertical plate 15, the horizontal baseplate 20, and the gusset plate 25. The main vertical plate 15 with the four-lug pattern 30 (as shown in FIG. 3) is identical in appearance to the side of main vertical plate 15 with the five-lug pattern 65 (as shown in FIGS. 5 and 6).

Figure 8:
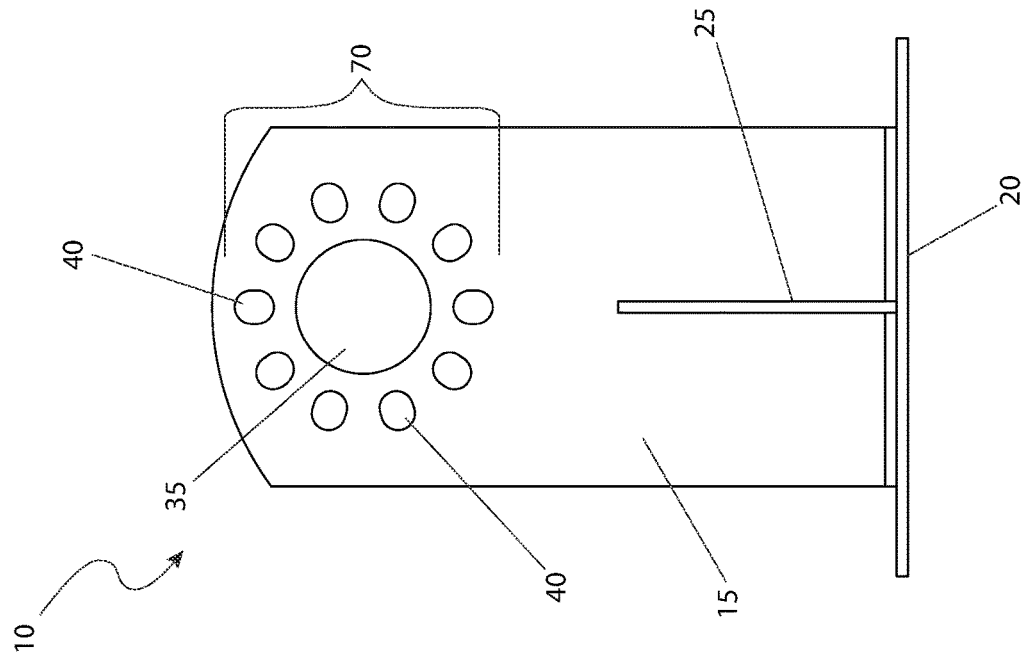
FIG. 8 is a perspective view of the vehicle support stand device, according to the third embodiment of the present invention.

Referring next to FIG. 8, a perspective view of the device 10, according to the third embodiment of the present invention is depicted. The previous teachings of the first embodiment, and the second embodiment including the main vertical plate 15, the horizontal baseplate 20, and the gusset plate 25 are again provided in the same size and configuration and would be made of one quarter inch (¼ in.) plate steel. The upper part of the main vertical plate 15 would be provided with a uni-lug pattern 70 comprising a main center hub hole 35 and ten (10) lug holes 40. The main center hub hole 35 and the lug holes 40 would be configured, in this second embodiment, with the same proper size and orientation to align with the holes on multiple wheel lug patterns including four (4), five (5), eight (8) and ten (10) lug pattern wheel rim. As before, the use of the device 10 with the uni-lug pattern 70 allows for the support of a vehicle 45 in the same manner as a tire 55, as seen in FIG. 4.

Figure 9:
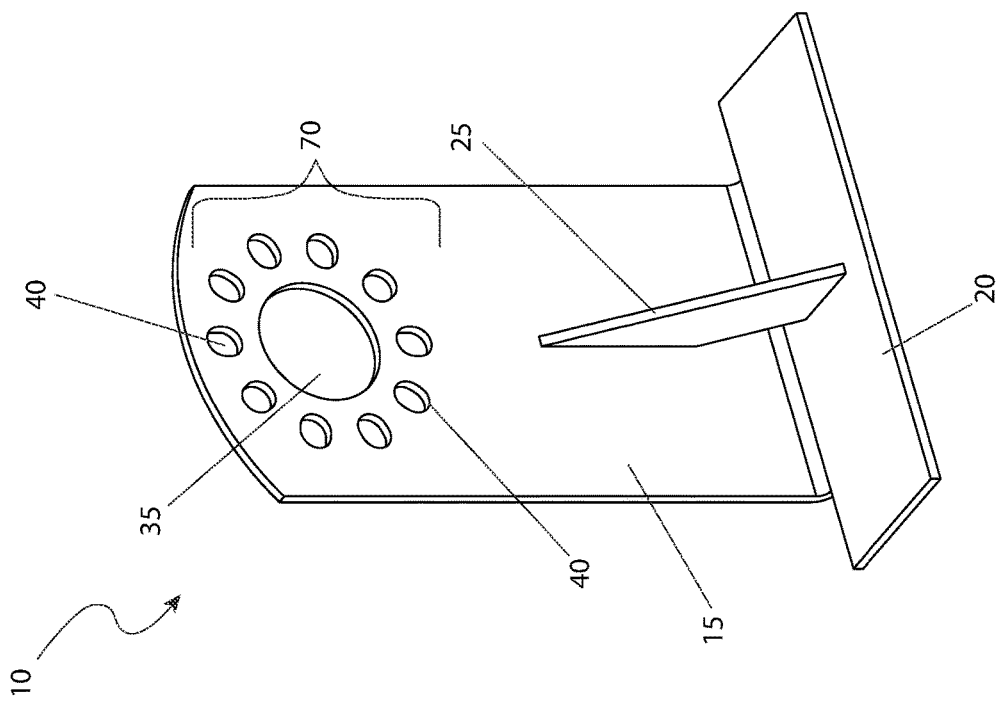
FIG. 9 is a front view of the vehicle support stand device, according to the third embodiment of the present invention.

Referring now to FIG. 9, a front view of the device 10, according to the third embodiment of the present invention is shown. This depiction provides further clarification on the main vertical plate 15, the horizontal baseplate 20, the gusset plate 25, the uni-lug pattern 70, the main center hub hole 35, and the lug holes 40 of the third embodiment.

Figure 10:
FIG. 10 is a side view of the vehicle support stand device, according to the third embodiment of the present invention.
Figure 10:
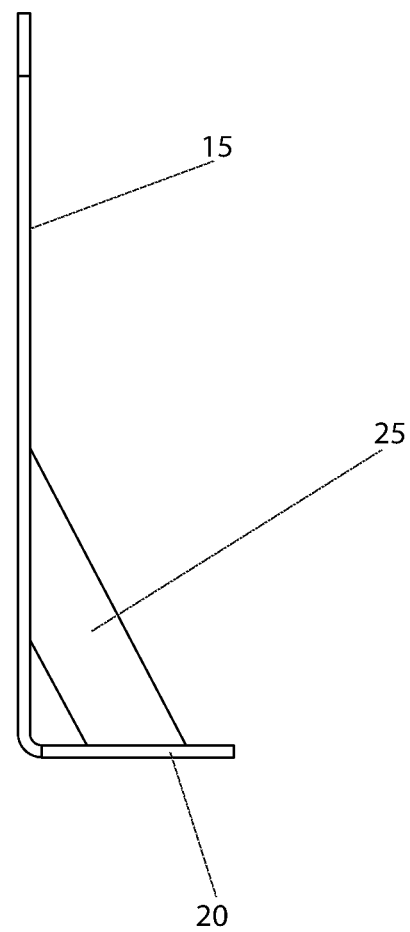

Referring to FIG. 10, a side view of the device 10, according to the third embodiment of the present invention is disclosed. This depiction again provides further clarification on the main vertical plate 15, the horizontal baseplate 20, and the gusset plate 25. The main vertical plate 15 with the four-lug pattern 30 (as shown in FIG. 3), and the main vertical plate 15 with the five-lug pattern 65, (as shown in FIG. 7) is identical in appearance to the side of main vertical plate 15 with the uni-lug pattern 70 (as shown in FIGS. 8 and 9).

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 10. The user would procure the device 10 from conventional procurement channels such as auto parts retailers, hardware stores, mechanical supply houses, mail order and internet supply houses and the like. Special attention would be paid to preference and purchase of the four-lug pattern 30 of the first embodiment, the five-lug pattern 65 of the second embodiment, and/or the uni-lug pattern 70 of the third embodiment.

During utilization of the device 10, the following procedure would be initiated: the vehicle 45 would be jacked up using a conventional jack in a conventional manner; the lug nuts 50 would be removed from the tire 55 using a suitable tool such as a lug wrench or socket; with the tire 55 removed, the device 10 is installed in place of the tire 55 by placing the lug nuts 50 over the lug holes 40 on the main vertical plate 15, on the wheel studs, and tightened to the proper specification. At this point in time, the vehicle 45 may be lowered using the jack, with the result of the vehicle 45 now being supported with the device 10 in lieu of the removed tire 55. The above sequence may be repeated with other tires 55 as needed. The vehicle 45 may then be left upon the device 10 for as long as needed. At the time when the tire 55 is returned to the vehicle 45, the above-mentioned process is reversed.

After use of the device 10, the device 10 may be stored until needed again in a repeating and cyclical manner. It is envisioned that use of the present invention provides the following benefits: the device 10 provides a stable platform that is not subject to accidental dislodgement due to bumping or jostling; strength to hold even the heaviest of vehicle 45, a gusset plate 25 which prevents deformation of the main vertical plate 15 and horizontal baseplate 20 under heavy side forces; protects the vehicle 45 and/or tires 55 from theft, universal use on all types of vehicle 45 with any type of lug pattern; physical protection of the removed tires 55 from UV exposure, flat spots, rot, environmental exposure and the like; increased accessibility in the wheel well 60 area for easier repair and/or maintenance of the vehicle 45, and protection of expensive aftermarket wheels rims, that are removed from the vehicle 45, due to exposure to the elements.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vehicle support stand device, consisting of:
    a main vertical plate made of one-quarter inch plate steel and having an upper portion with a lug pattern;
    a horizontal baseplate made of one-quarter inch plate steel, oriented perpendicularly to the main vertical plate and joined thereto at a lower portion of the main vertical plate; and,
    a gusset plate made of one-quarter inch plate steel positioned between the main vertical plate and the horizontal baseplate at an angle of approximately forty-five degrees and joined to both the main vertical plate and the horizontal baseplate; and,
    wherein the lug pattern of the main vertical plate includes a center hub hole and ten lug holes arranged in a uni-lug pattern to permit alignment with four-lug, five-lug, eight-lug, and ten-lug vehicle wheel rims;
    wherein the device is configured to be mounted to a vehicle hub using lug nuts that secure the main vertical plate directly to the vehicle in place of a removed wheel; and,
    wherein the removal of the wheel and installation of the vehicle support stand device permits unobstructed access to a region surrounding the removed wheel for a purpose of maintenance or repair, and enables the removed wheel to be stored separately from the vehicle.

* * * * *